April 21, 1964     W. B. McLEAN     3,129,767
TORQUE CONVERTING PROPELLER
Filed Jan. 12, 1962
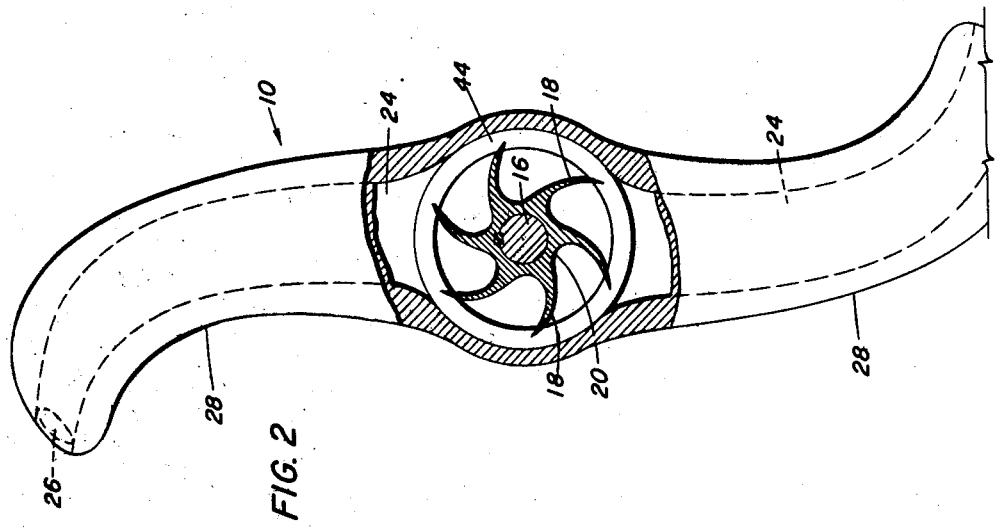
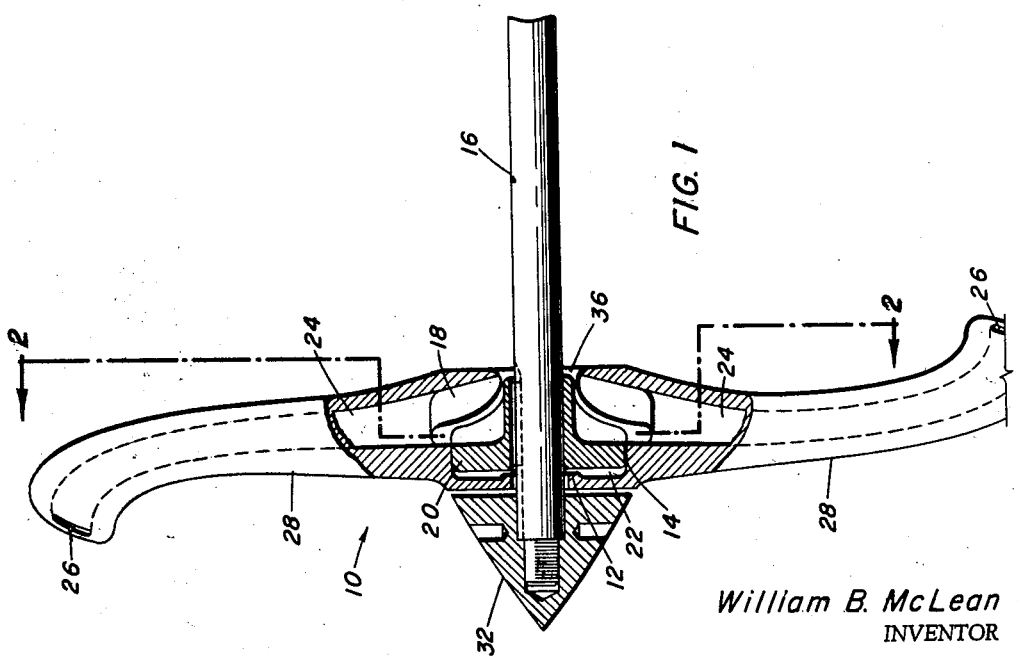
William B. McLean
INVENTOR
BY Walter G. Finch
ATTORNEY

United States Patent Office 3,129,767
Patented Apr. 21, 1964

3,129,767
TORQUE CONVERTING PROPELLER
William B. McLean, 510 Lexington St., China Lake, Calif., assignor of fifty percent to Walter G. Finch, Baltimore, Md.
Filed Jan. 12, 1962, Ser. No. 165,862
8 Claims. (Cl. 170—135.4)

This invention relates generally to fluid current motors, and more particularly it pertains to a torque converting propeller.

It is an object of this invention to provide a hydraulic speed reduction system which will allow a slow speed propeller to be carried on a high speed drive shaft without the need for a mechanical reduction gear.

It is another object of this invention to provide a fluid bearing for a propeller in both radial and axial directions which will be supported by the hydraulic pressures generated by the pump.

It is a further object of this invention to provide a new type of torque converting propeller which will eliminate the noise commonly associated with mechanical gear reduction of the equivalent ratio.

It is a further object of this invention to provide a propeller which will rotate in a single direction independent of the direction of rotation of the drive shaft.

It is a further object of this invention to provide a propeller which will turn freely on the shaft in the absence of power to the drive shaft.

And yet another object of this invention is to provide a ratio propeller for water craft which is easy and economical to manufacture, efficient, and reliable in operational use and easy to install.

Other objects and attendant advantages of this invention will become more readily apparent and understood from the accompanying specification and single sheet of drawings in which:

FIG. 1 is a vertical section partly in elevation of a torque converting propeller incorporating features of this invention; and FIG. 2 is the cross-section taken along the line 2—2 of FIG. 1.

Referring now to FIG. 1, a torque-converting propeller, which is intended to be immersed in a fluid and which is designated generally by reference numeral 10 consists of a hollow helical propeller blade 28 which is mounted by means of a fluid bearing on a high speed shaft 16 carrying a centrifugal impeller 20.

The shaft 16 is driven by any high speed motor (not shown). The centrifugal impeller 20 is keyed securely to the extended portion of the driven shaft 16.

This impeller 20 rotates in the propeller hub 30 which is equipped with diffusers 18 and it causes water or other fluid in which it is immersed to enter a central opening 36 and to flow outwardly through passages 24 to trailing tips of the propeller blade 28 and exit through the oppositely directed orifices 26.

The action of the impeller 20 and the diffusers 18 is such as to also generate a peripheral pressure in the cavity 24. This pressure will cause the fluid to flow in the clearance passage 14 between the rim of the high speed impeller 20 and the center section or hub 30 of the slow speed propeller 10.

The flow of fluid in the clearance passage 14 will effectively provide a radial fluid bearing to support the propeller blade 28. Water escaping from the backside of the clearance passage 14 will enter a cavity 22.

After the action of the thrust of the propeller 10, the lip 12 will close to prevent fluid from escaping from the cavity 22 until the pressure in this cavity 22 has risen to a value sufficient to balance the forward thrust of the propeller 10.

At this point, the lip 12 will disengage from the backside of the impeller 20 and will maintain itself with sufficient clearance so that the pressure in cavity 22 times the active area of the backface of the impeller 20 will be just sufficient to balance the forward thrust of the propeller 10.

The cavity 22 and lip 12 thus combine to form the thrust portion of the fluid bearing support for the propeller blade 28. In the non-operating condition, a cap 32 acts to retain the propeller blade 28 in a position ready for further operation.

This type of torque converter is particularly useful in the propulsion of vessels, such as sailboats where it is desired to use a high speed engine with a large diameter, slowly revolving propeller in order to generate high forward thrust in this application.

Also, it is advantageous where the propeller is to be disengaged and free rotating as soon as the source of auxiliary power is removed. This action is accomplished with the torque converting propeller 10 of this invention. It should further be noted that changes in propeller speed and, therefore, effective "gear" ratio can be accomplished by varying the size and direction of the exit orifices 26.

Obviously, many modifications and variations of the present invention are possible in the light of the above teachings. It is, therefore, to be understood that within the scope of the appended claims the invention may be practiced otherwise than as specifically described.

What is claimed is:

1. A torque converting propeller system, comprising, a drive shaft, an impeller secured to and rotatable with said drive shaft, a propeller having a chambered hub encompassing said impeller with an annular clearance for free rotation about said impeller, said chambered hub having a fluid inlet passage on one side arranged in close proximity to said drive shaft for passing fluid to said impeller, said annular clearance between said impeller and chambered hub of said propeller forming a fluid rotary bearing created by flow of said fluid under pressure from said impeller, said propeller having at least one blade with a passageway therein communicating between the chambered hub and a rearwardly directed orifice in the tip of said blade, whereby fluid is passed from said fluid inlet passage in said chambered hub through said impeller to said passageway and orifice in said propeller to rotate said blade.

2. A torque converting propeller system, comprising, a drive shaft, an impeller secured to and rotatable with said drive shaft, a propeller having a chambered hub encompassing said impeller and freely rotatable thereabout, said chambered hub having a fluid inlet passage on one side arranged in close proximity to said drive shaft for passing fluid to said impeller, the opposite side of said chambered hub having an annular cavity for receiving said fluid under pressure from said impeller to form a fluid thrust bearing for said propeller, said propeller having at least one blade with a passageway therein communicating between the chambered hub and a rearwardly directed orifice in the tip of said blade, whereby fluid is passed from said fluid inlet passage in said chambered hub through said impeller to said passageway and orifice in said propeller to rotate said blade.

3. The torque converting system of claim 1, wherein said fluid is water.

4. The torque converting system of claim 2 wherein said fluid is water.

5. A torque converting propeller system, comprising, a drive shaft, an impeller secured to and rotatable with said drive shaft, a propeller having a chambered hub encompassing said impeller with an annular clearance for free rotation about said impeller, said chambered hub having a water inlet passage arranged in close proximity to said drive shaft for passing water to said impeller, said annular clearance between said impeller and chambered hub of said propeller forming a fluid rotary bearing created by flow of said water under pressure from said impeller, the opposite side of said chambered hub having an annular cavity for receiving said water under pressure from said impeller to form a fluid thrust bearing for said propeller, the blades of said propeller each having a passageway therein communicating between the chambered hub and a rearwardly directed orifice in the tip thereof, whereby water is passed from said water inlet passage in said chambered hub through said impeller to said passageway and orifice in each blade of said propeller to effect the rotation thereof.

6. A torque converting propeller system, comprising, a drive shaft, an impeller having a blade portion and an annular disc portion secured to and rotatable with said drive shaft, a propeller having a chambered hub encompassing said impeller with an annular clearance therebetween and the lateral side of annular disc portion of said impeller for free rotation of said propeller about said impeller, said chambered hub having a water inlet passage arranged in close proximity to said drive shaft for passing water to said impeller, said annular clearance between the annular disc portion of said impeller and said chambered hub of said propeller forming a fluid rotary bearing created by flow of said water under pressure from said impeller, the opposite side of said chambered hub having an annular cavity for receiving said water under pressure from said impeller to form a fluid thrust bearing between the annular disc portion of said impeller and said opposite side of said chambered hub for said propeller, the blades of said propeller each having a passageway therein communicating between the chambered hub and a rearwardly directed orifice in the tip thereof, water is passed from said water inlet passage in said chambered hub through said impeller to said passageway and orifice in each blade of said propeller to effect rotation thereof.

7. The torque converting propeller system of claim 6, wherein means retaining said propeller on said drive shaft are provided.

8. The torque converting propeller system of claim 6, wherein lip means extend adjacent said drive shaft from said opposite side of said chambered hub to engage said annular disc portion of said impeller when the water pressure in said annular cavity is insufficient to balance the thrust of said propeller.

References Cited in the file of this patent

UNITED STATES PATENTS

| | | |
|---|---|---|
| 1,030,153 | Barbezat | June 18, 1912 |
| 1,923,054 | Holmes et al. | Aug. 15, 1933 |
| 2,021,481 | Dornier | Nov. 19, 1935 |
| 2,491,693 | Sivertsen | Dec. 20, 1949 |
| 2,511,156 | Glass | June 13, 1950 |
| 2,983,054 | Macks | May 9, 1961 |
| 2,994,384 | Stevens | Aug. 1, 1961 |

FOREIGN PATENTS

| | | |
|---|---|---|
| 159,569 | Great Britain | Feb. 24, 1921 |
| 148,328 | Switzerland | Sept. 16, 1931 |
| 489,231 | Germany | Jan. 15, 1930 |